(12) United States Patent
Nakamura et al.

(10) Patent No.: US 11,748,269 B2
(45) Date of Patent: Sep. 5, 2023

(54) CACHE TUNING DEVICE, CACHE TUNING METHOD, AND CACHE TUNING PROGRAM

(71) Applicant: Nippon Telegraph and Telephone Corporation, Tokyo (JP)

(72) Inventors: Tetsuro Nakamura, Musashino (JP); Naoki Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/626,590

(22) PCT Filed: Jul. 29, 2019

(86) PCT No.: PCT/JP2019/029690
§ 371 (c)(1),
(2) Date: Jan. 12, 2022

(87) PCT Pub. No.: WO2021/019652
PCT Pub. Date: Feb. 4, 2021

(65) Prior Publication Data
US 2022/0318159 A1    Oct. 6, 2022

(51) Int. Cl.
*G06F 12/1045* (2016.01)
*G06F 3/06* (2006.01)

(52) U.S. Cl.
CPC ........ *G06F 12/1045* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS

| | | | |
|---|---|---|---|
| 2010/0095300 A1* | 4/2010 | West | G06F 9/5055 718/104 |
| 2015/0186185 A1* | 7/2015 | Zaroo | G06F 9/4881 718/104 |

FOREIGN PATENT DOCUMENTS

| | | | | |
|---|---|---|---|---|
| CN | 110688062 A | * | 1/2020 | ......... G06F 12/0646 |
| JP | 2010238112 | | 10/2010 | |
| JP | 2018112946 | | 7/2018 | |

OTHER PUBLICATIONS

Nguyen, "Intel's Cache Monitoring Technology: Use Models and Data," Intel Corporation, Mar. 31, 2016, retrieved from URL <https://software.intel.com/en-us/blogs/2014/12/11/intels-cache-monitoring-technology-use-models-and-data>, 14 pages.

(Continued)

*Primary Examiner* — Brian R Peugh
(74) *Attorney, Agent, or Firm* — Fish & Richardson P.C.

(57) ABSTRACT

Performance optimization is achieved by clarifying cache usage characteristics of each application from usage conditions of physical resources (caches) in real time and automatically controlling the cache usage amount of each application. Thus, a system includes a main memory to and from which data is written and read, a level 3 cache memory which can be accessed faster than the main memory, a CPU core configured to execute processing by performing write and read to and from the memory and the cache, a usage amount measurement unit configured to measure a usage condition of a cache of each virtual machine (13a to 13c) executed by the CPU core, an allocation amount calculation unit configured to calculate cache capacity to be allocated to each virtual machine (13a to 13c) from the usage condition, and a control unit configured to allocate the cache capacity to each virtual machine (13a to 13c).

11 Claims, 10 Drawing Sheets

(52) U.S. Cl.
CPC .......... *G06F 3/0656* (2013.01); *G06F 3/0664* (2013.01); *G06F 2212/68* (2013.01)

(56) References Cited

OTHER PUBLICATIONS

Nguyen, "Usage Models for Cache Allocation Technology in the Intel Xeon Processor E5 v4 family," Intel Corporation, Feb. 11, 2016, retrieved from URL <https://software.intel.com/en-us/articles/cache-allocation-technology-usage-models>, 6 pages.

* cited by examiner

Fig. 4

| | reference (/ms) | prefetch (/ms) | SUM(ref+pre) | dTLB miss (/ms) |
|---|---|---|---|---|
| VM A | 70416 | 127422 | 197839 | 28 |
| VM B | 7026 | 11999 | 19025 | 21 |
| VM C | 86753 | 10233 | 96987 | 11488 |

| | Sensitivity | Pollutivity | S+(1-P) | Normalize |
|---|---|---|---|---|
| VM A | 1.000 | 0.002 | 1.998 | 1.00 |
| VM B | 0.096 | 0.002 | 1.094 | 0.55 |
| VM C | 0.490 | 1.000 | 0.490 | 0.25 |

| | Capacity Mask | | | | | | | | | | | | | | |
|---|---|---|---|---|---|---|---|---|---|---|---|---|---|---|---|
| VM A CLOS | 1 | 1 | 1 | 1 | 1 | 1 | 1 | 1 | 1 | 1 | 1 | 1 | 1 | 1 | 1 |
| VM B CLOS | 1 | 1 | 1 | 1 | 1 | 1 | 1 | 1 | 1 | 0 | 0 | 0 | 0 | 0 | 0 |
| VM C CLOS | 1 | 1 | 1 | 1 | 0 | 0 | 0 | 0 | 0 | 0 | 0 | 0 | 0 | 0 | 0 |

Fig. 6

|          | Capacity Mask |   |   |   |   |   |   |   |   |   |   |   |   |   |   |   |
|----------|---|---|---|---|---|---|---|---|---|---|---|---|---|---|---|---|
| VM A CLOS | 1 | 1 | 1 | 1 | 1 | 1 | 1 | 1 | 1 | 0 | 0 | 0 | 0 | 0 | 0 | 0 |
| VM B CLOS | 0 | 0 | 0 | 0 | 0 | 0 | 0 | 0 | 0 | 1 | 1 | 1 | 1 | 1 | 0 | 0 |
| VM C CLOS | 0 | 0 | 0 | 0 | 0 | 0 | 0 | 0 | 0 | 0 | 0 | 0 | 0 | 0 | 1 | 1 |

Fig. 7

|          | Capacity Mask |   |   |   |   |   |   |   |   |   |   |   |   |   |   |   |
|----------|---|---|---|---|---|---|---|---|---|---|---|---|---|---|---|---|
| VM A CLOS | 1 | 1 | 1 | 1 | 1 | 1 | 1 | 1 | 1 | 1 | 1 | 1 | 1 | 1 | 1 | 1 |
| VM B CLOS | 1 | 1 | 1 | 1 | 1 | 1 | 1 | 1 | 1 | 0 | 0 | 0 | 0 | 0 | 0 | 0 |
| VM C CLOS | 0 | 0 | 0 | 0 | 0 | 0 | 0 | 0 | 0 | 1 | 1 | 1 | 1 | 0 | 0 | 0 |

Fig. 11

|  | 15 ← Capacity Mask → 0 |
|---|---|
| CLOS[0]:Mask | 1 1 1 1 0 0 0 0 0 0 0 0 0 0 0 0 |
| CLOS[1]:Mask | 0 0 0 0 1 1 1 1 0 0 0 0 0 0 0 0 |
| CLOS[2]:Mask | 0 0 0 0 0 0 0 0 1 1 1 1 1 1 0 0 |
| CLOS[3]:Mask | 0 0 0 0 0 0 0 0 1 1 1 1 1 1 1 1 |

CACHE TUNING DEVICE, CACHE TUNING METHOD, AND CACHE TUNING PROGRAM

CROSS-REFERENCE TO RELATED APPLICATIONS

This application is a National Stage application under 35 U.S.C. § 371 of International Application No. PCT/JP2019/029690, having an International Filing Date of Jul. 29, 2019. The disclosure of the prior application is considered part of the disclosure of this application, and is incorporated in its entirety into this application.

TECHNICAL FIELD

The present invention relates to a cache tuning device, a cache tuning method, and a cache tuning program.

BACKGROUND ART

In a virtual cloud environment, typically, an operator who has authority to administer a physical host is different from a user who actually deploys a virtual machine to run an application.

In a virtual cloud environment which supports multiple tenants, virtual machines of different tenants can be deployed on the same physical host. Thus, instead of the user side, the operator side plays a role of tuning performance by controlling a cache.

FIG. 10 is a graph indicating relationship between cache occupancy of each application and normalized performance. Note that FIG. 10 is cited from a graph in Non-Patent Literature 1.

The graph indicates cache occupancy on an axis of abscissas and indicates normalized performance on an axis of ordinates. Diamond plots are plots relating to Povray. Rectangular plots are plots relating to Bzip2. Triangular plots are plots relating to MCF. X-marked plots are plots relating to Bwaves.

As indicated in this graph, as the cache occupancy decreases, the number of cache misses increases. In Bwaves, in a case where the cache occupancy is set to 0 MB, performance decreases by approximately 60% compared to a case where the cache occupancy is set to 15 MB. It is therefore possible to improve performance of an application by appropriately setting the cache occupancy.

FIG. 11 is a view illustrating an example of a cache allocation technology of 16 bits.

As described in Non-Patent Literature 2, after an E5 2600 v3 production family of Intel Xeon (registered trademark) processor released in September, 2014, a cache allocation technology which is a function of being able to restrict and control utilization of a last level cache for each application is implemented.

In these processors, a level of a class of service (CLOS) can be determined for each application process, and a range of a level 3 cache memory 34, which is to be used, is controlled with a capacity mask for each CLOS.

In the example in FIG. 11, four bits of CLOS[0] from bit 15 to bit 12 are 1, which indicates that ¼ of the level 3 cache memory 34 is used. Note that only CLOS[0] includes bits which are 1 from bit 15 to bit 12, which indicates that an application relating to CLOS[0] occupies a region corresponding to these bits. Note that each bit of CLOS[n] corresponding to each region of the level 3 cache memory 34.

CLOS[1] includes four bits from bit 11 to bit 8 which are 1, which indicates that ¼ of the level 3 cache memory is used. Note that only CLOS[1] includes bits which are 1 from bit 11 to bit 8, which indicates that an application relating to CLOS[1] occupies a region corresponding to these bits.

CLOS[2] includes six bits from bit 7 to bit 2 which are 1, which indicates that ⅜ of the level 3 cache memory 34 is used. Note that CLOS[3] also includes bits which are 1 from bit 7 to bit 2 in a similar manner, which indicates that an application relating to CLOS[2] and CLOS[3] share a region corresponding to these bits.

CLOS[3] includes eight bits from bit 7 to bit 0 which are 1, which indicates that ½ of the level 3 cache memory 34 is used. Note that CLOS[3] also includes bits which are 1 from bit 7 to bit 2, which indicates that an application relating to CLOS[2] and an application relating to CLOS[3] share a region corresponding to these bits. Only CLOS[3] includes bits which are 1 from bit 1 to bit 0, which indicates that the application relating to CLOS[3] occupy a region corresponding to these bits.

CITATION LIST

Patent Literature

Non-Patent Literature 1: Nguyen, Khang T, "Intel's Cache Monitoring Technology: Use Models and Data", [online], published on Dec. 11, 2014, updated on Mar. 31, 2016, Accessed on Jul. 25, 2019, Retrieved from: https://software.intel.com/en-us/blogs/2014/12/11/intels-cache-monitoring-technology-use-models-and-data Non-Patent Literature 2: "Usage Models for Cache Allocation Technology in the Intel Xeon Processor E5 v4 family", [online], Accessed on Jul. 25, 2019, Retrieved from: https://software.intel.com/enus/articles/cache-allocation-technology-usage-models

SUMMARY OF THE INVENTION

Technical Problem

However, it is not common that the user notifies the operator side of information regarding an amount of cache used by an application beforehand to deploy a virtual machine. Further, it is not common that the user notifies the operator of a performance value indicated by an application in real time.

In a case where the operator is not notified of information regarding cache usage of an application from the user, how to control an amount of cache used by each application is unclear. Further, also in a case where a system is not notified of information regarding a performance value indicated by an application in real time, how to control an amount of cache used by each application is unclear.

Thus, a problem to be solved by the invention is to optimize performance of each application by automatically controlling an amount of cache used by each application which runs on a physical host.

Means for Solving the Problem

To solve the above-described problem, a cache tuning device of the present invention includes a memory to and from which data is written and read, a cache which can be accessed faster than the memory, a central processing unit configured to execute processing by performing write and read to and from the memory and the cache, a measurement unit configured to measure a usage condition of the cache by each application executed by the central processing unit, a calculation unit configured to calculate cache capacity to be allocated to the application from the usage condition, and an allocation unit configured to allocate the cache capacity to the application. Other means will be described in Description of Embodiments.

Effects of the Invention

According to the present invention, it is possible to optimize performance of each application by automatically controlling an amount of cache used by each application which runs on a physical host.

BRIEF DESCRIPTION OF DRAWINGS

FIG. 4 is a view illustrating operation of setting a capacity mask from each index relating to caches.

FIG. 6 is a view illustrating another setting example of the capacity mask.

FIG. 7 is a view illustrating another setting example of the capacity mask.

FIG. 11 is a view illustrating an example of a cache allocation technology of 16 bits.

DESCRIPTION OF EMBODIMENT

An embodiment for implementing the present invention will be described in detail below with reference to the respective drawings.

Explanation of Background of the Invention

In a case where a plurality of virtual machines are made to run on a physical host, cache conflict may occur, and performance may be degraded.

Figure 8:
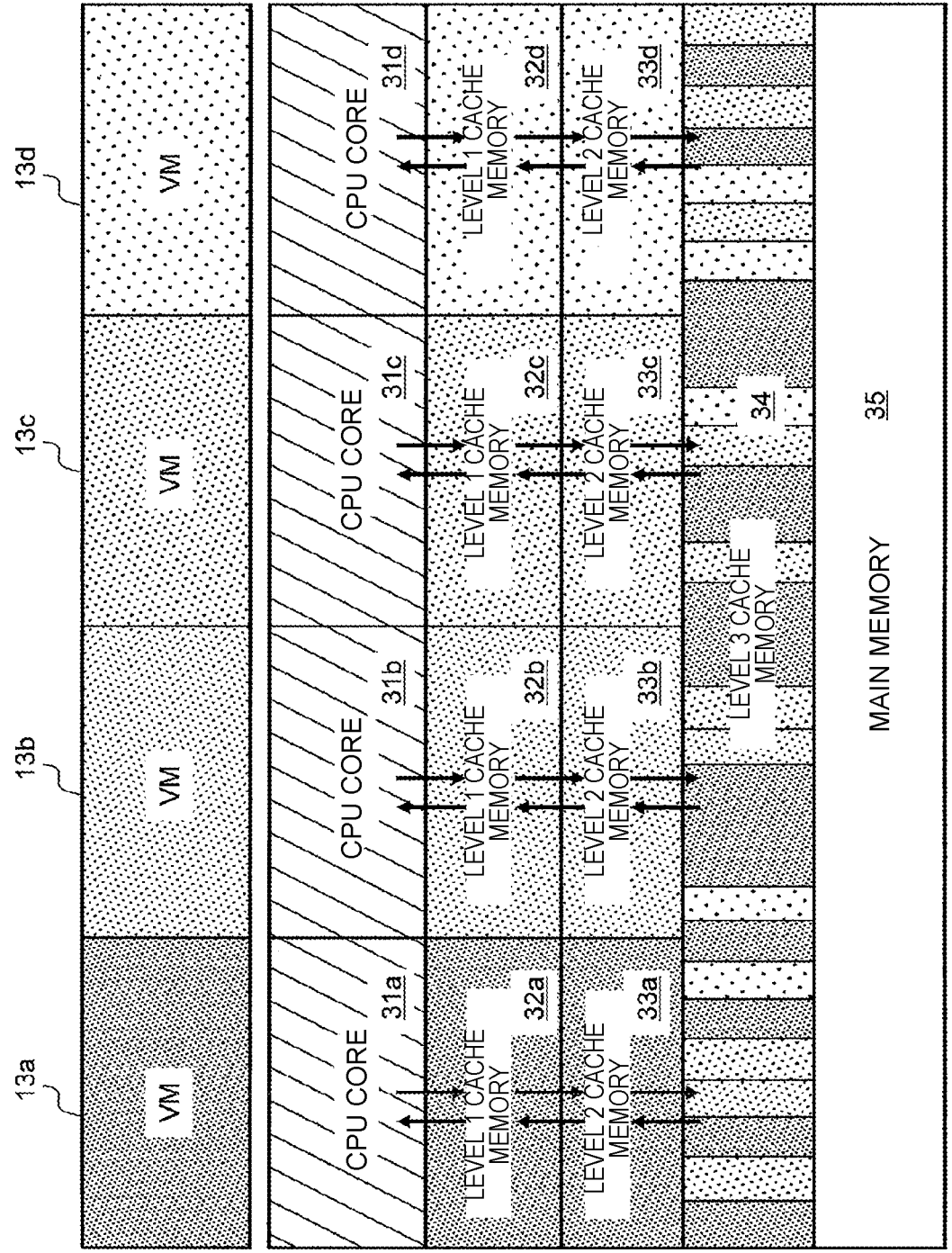
FIG. 8 is a view illustrating conditions of respective caches when a plurality of virtual machines are made to run on a physical host at the same time.
Figure 9:
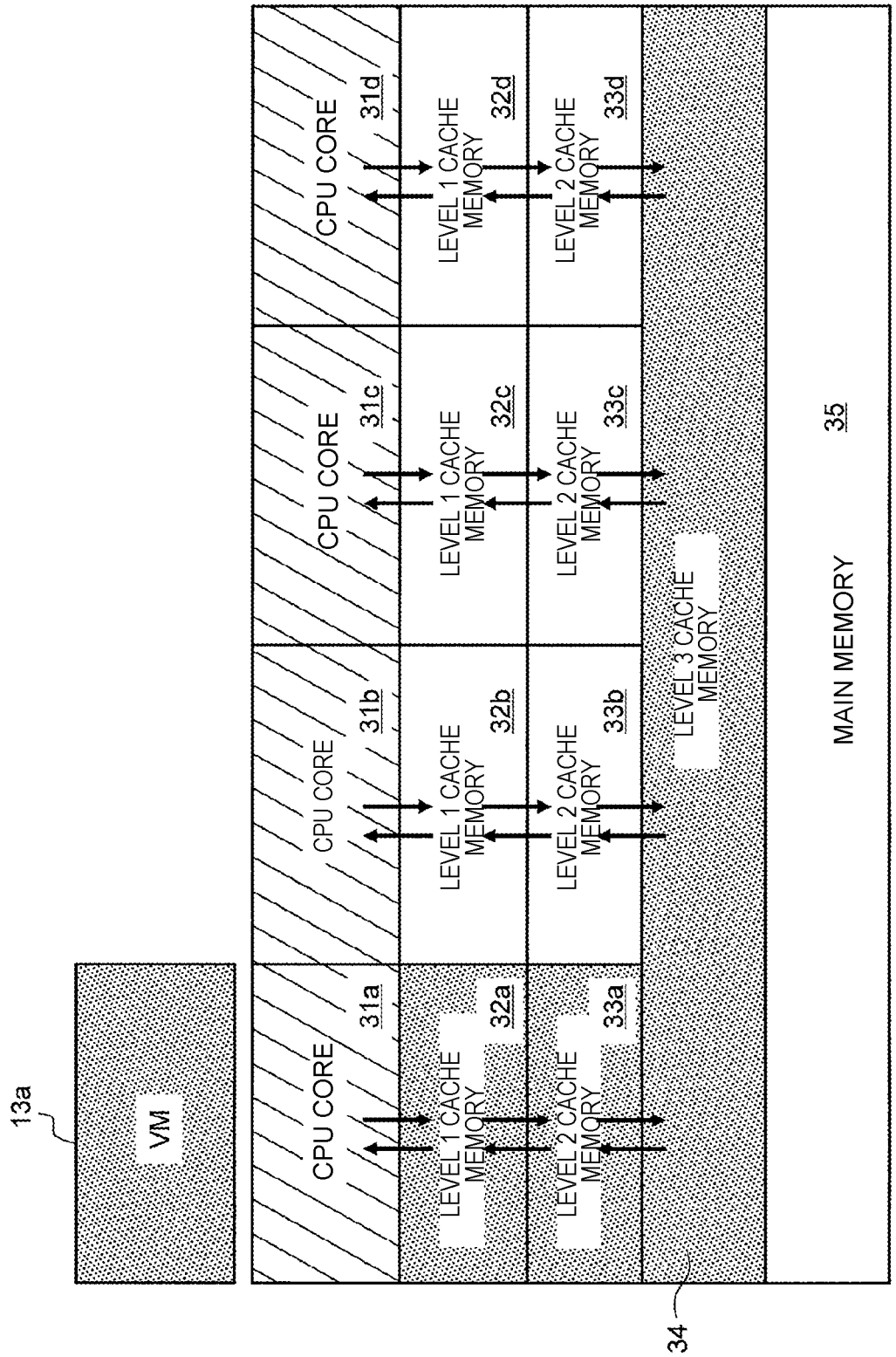
FIG. 9 is a view illustrating conditions of respective caches when a single virtual machine is made to run on the physical host.
Figure 10:
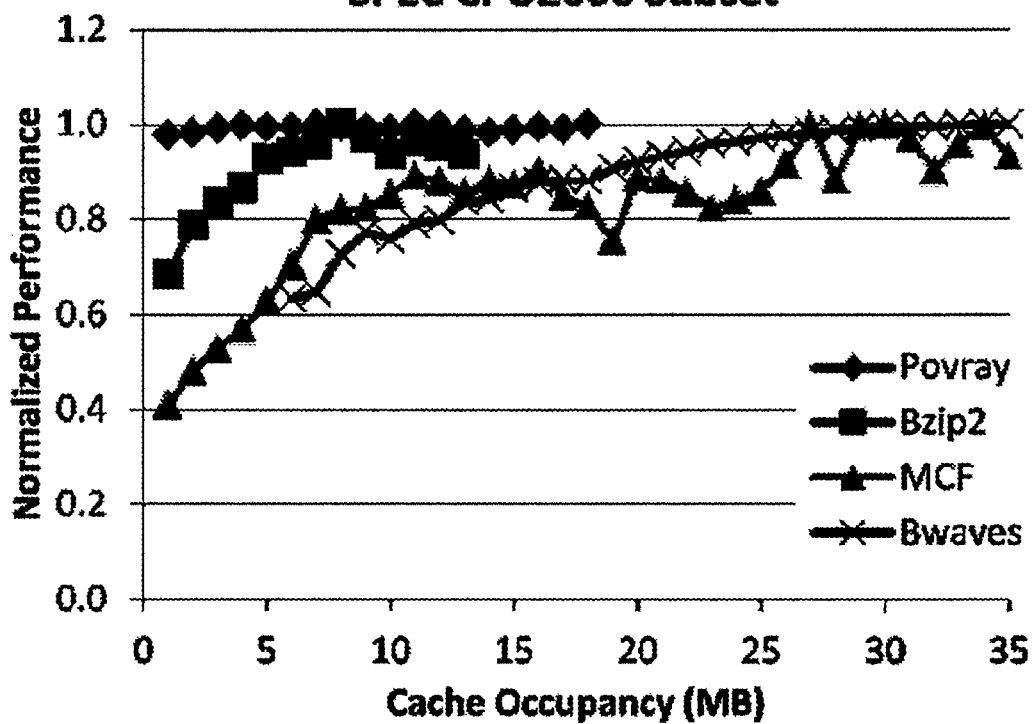
FIG. 10 is a graph indicating relationship between cache occupancy of each application and performance.

FIG. 8 is a view illustrating conditions of respective caches when a plurality of virtual machines 13a to 13d are made to run on a physical host 3 at the same time. FIG. 9 is a view illustrating conditions of respective caches when a single virtual machine 13a is made to run on the physical host 3.

The physical host 3 includes CPU (central processing unit) cores 31a to 31d, level 1 cache memories 32a to 32d, level 2 cache memories 33a to 33d, a level 3 cache memory 34 and a main memory 35. The main memory 35 is a RAM (random access memory) to and from which data is written and read. The level 1 cache memories 32a to 32d, the level 2 cache memories 33a to 33d, and the level 3 cache memory 34 are storage regions which can be accessed faster than the main memory 35. The CPU cores 31a to 31d are central processing units which execute processing by performing write and read to and from the level 1 cache memories 32a to 32d, the level 2 cache memories 33a to 33d, the level 3 cache memory 34 and the main memory 35.

In a multi-core configuration which is a mainstream in current CPUs, a plurality of CPU cores 31a to 31d typically share a low level cache such as the level 3 cache memory 34. Hereinafter, the CPU cores 31a to 31d will be simply described as a CPU core 31 when the CPU cores are not specifically distinguished from each other.

A plurality of virtual machines 13a to 13d run on the physical host 3 illustrated in FIG. 8. Hereinafter, the virtual machines 13a to 13d will be simply described as a virtual machine 13 when the virtual machines 13a to 13d are not specifically distinguished from each other.

The virtual machine 13a occupies the CPU core 31a, the level 1 cache memory 32a and the level 2 cache memory 33a and further shares part of the level 3 cache memory 34.

The virtual machine 13b occupies the CPU core 31b, the level 1 cache memory 32b and the level 2 cache memory 33b and further shares part of the level 3 cache memory 34.

The virtual machine 13c occupies the CPU core 31c, the level 1 cache memory 32c and the level 2 cache memory 33c and further shares part of the level 3 cache memory 34.

The virtual machine 13d occupies the CPU core 31d, the level 1 cache memory 32d and the level 2 cache memory 33d and further shares part of the level 3 cache memory 34.

In a case where a plurality of virtual machines 13a to 13d run on the same node, the level 3 cache memory 34 is polluted by the virtual machines 13a to 13d, and cache misses relatively increase. The CPU core 31 in which cache misses occur has to refer to the main memory 35 which requires access time several times as much as access time of the level 3 cache memory 34. Performance of the virtual machine 13 may be degraded due to such penalty of cache misses. This will be referred to as cache conflict by a plurality of virtual machines 13.

In contrast, a single virtual machine 13a runs on the physical host 3 illustrated in FIG. 9. When the virtual machine 13a is made to run alone, the level 3 cache memory 34 which is a shared cache memory is occupied. In this event, any other virtual machine 13 does not run, and thus, cache pollution does not occur.

Figure 12:
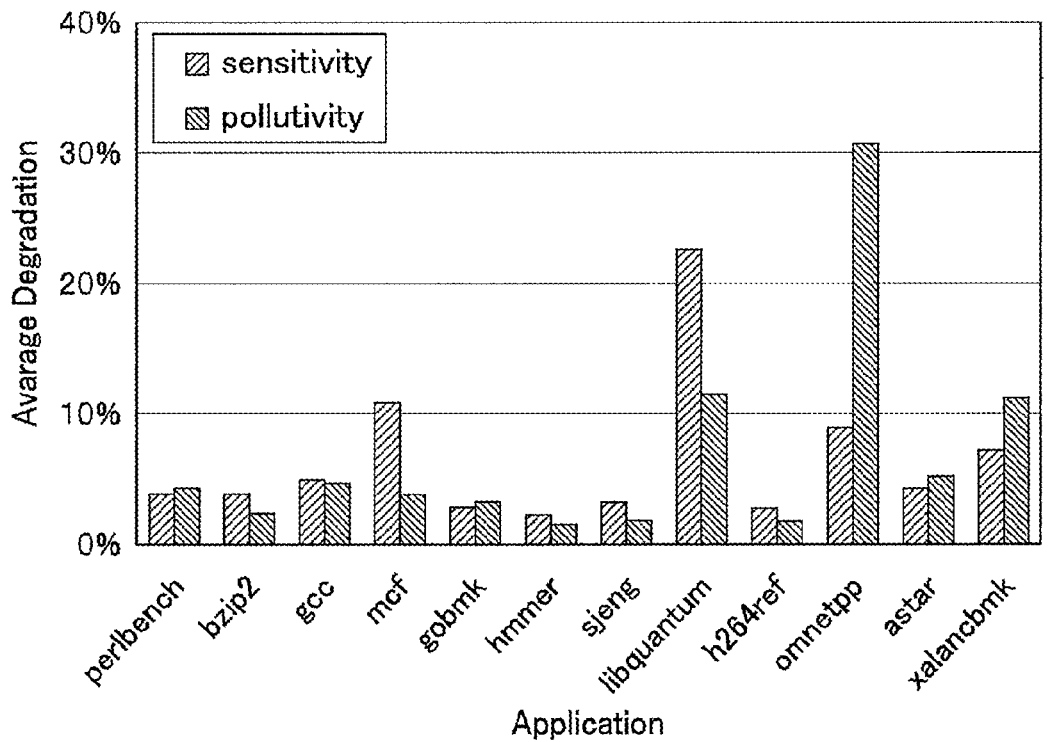
FIG. 12 is a graph indicating cache sensitivity and cache pollutivity of each application.

FIG. 12 is a graph indicating cache sensitivity and cache pollutivity of each application. This graph indicates a result of evaluation of characteristics of an application from two viewpoints of cache sensitivity and cache pollutivity.

Note that in each graph, there is a case where the cache sensitivity is described as cache sensitivity, and the cache pollutivity is described as cache pollutivity.

The cache sensitivity is an index representing a level of cache dependency of an application. The cache sensitivity becomes higher for an application whose performance is more susceptible to decrease in a cache hit ratio.

The cache pollutivity is an index representing a likelihood of an application polluting a cache. The cache pollutivity becomes higher for an application which requires frequent change of cache lines and which lowers a cache hit ratio of other application.

The cache sensitivity and the cache pollutivity indicated in this graph are measured as follows.

(First step) A plurality of applications are prepared, and performance in a case where each of the plurality of applications is made to run alone and a cache access statistic in each case are respectively measured.

(Second step) Performance in a case where a plurality of applications are made to run in combination at the same time is measured.

(Third step) A degree of degradation of the performance in a case where each application is made to run in combination with other application at the same time with respect to the performance in a case where the application is made to run alone is calculated.

The inventors have confirmed as a result of such evaluation of each application that some applications have high cache sensitivity and other applications have high cache pollutivity and they are separately exist.

Figure 13:
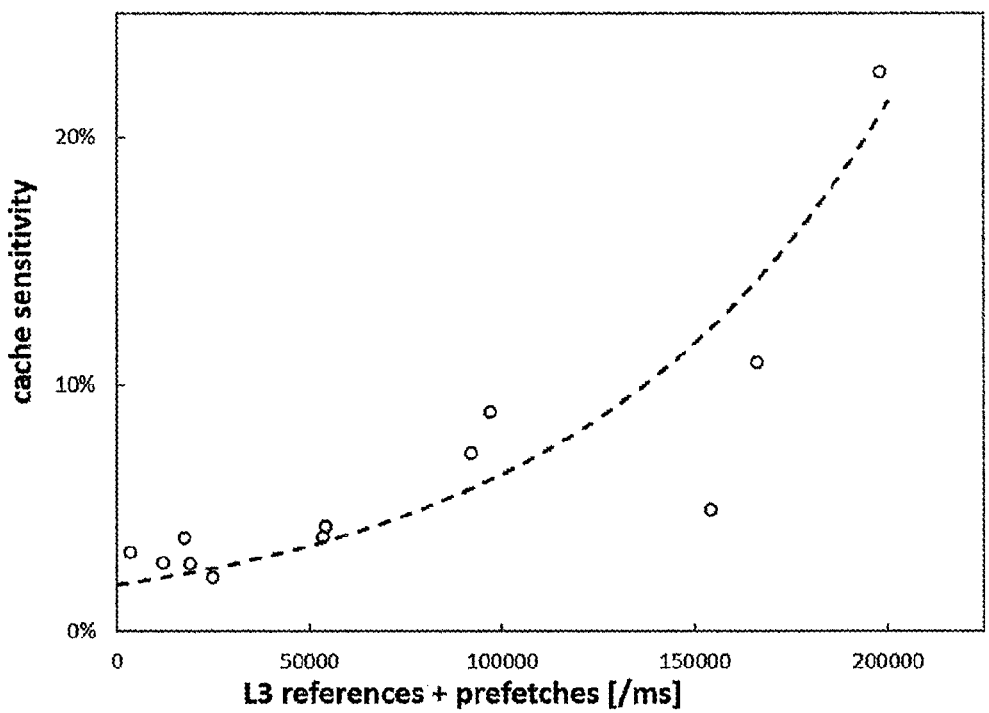
FIG. 13 is a graph indicating relationship between a sum of the number of cache references and the number of prefetches of each application, and cache sensitivity.

FIG. 13 is a graph indicating relationship between a sum of the number of cache references and the number of prefetches of each application, and the cache sensitivity.

The inventors have predicted that the number of cache references [/s] can be used as an index of the cache sensitivity, but have found that the cache sensitivity is also actually highly correlated with the number of prefetches [/s]. Here, the prefetch refers to loading of data which is predicted to be used in the future, in a cache in advance.

Performance of an application with a large number of cache references may be largely degraded due to resource contention of caches, because it has higher utilization of caches than an application with a small number of cache references. Further, performance of an application with a large number of prefetches may be largely degraded due to resource contention of caches, because it effectively utilizes caches compared to an application with a small number of prefetches.

Thus, in the present embodiment, the inventors use a sum of the number of cache references and the number of prefetches as an index of the cache sensitivity.

Figure 14:
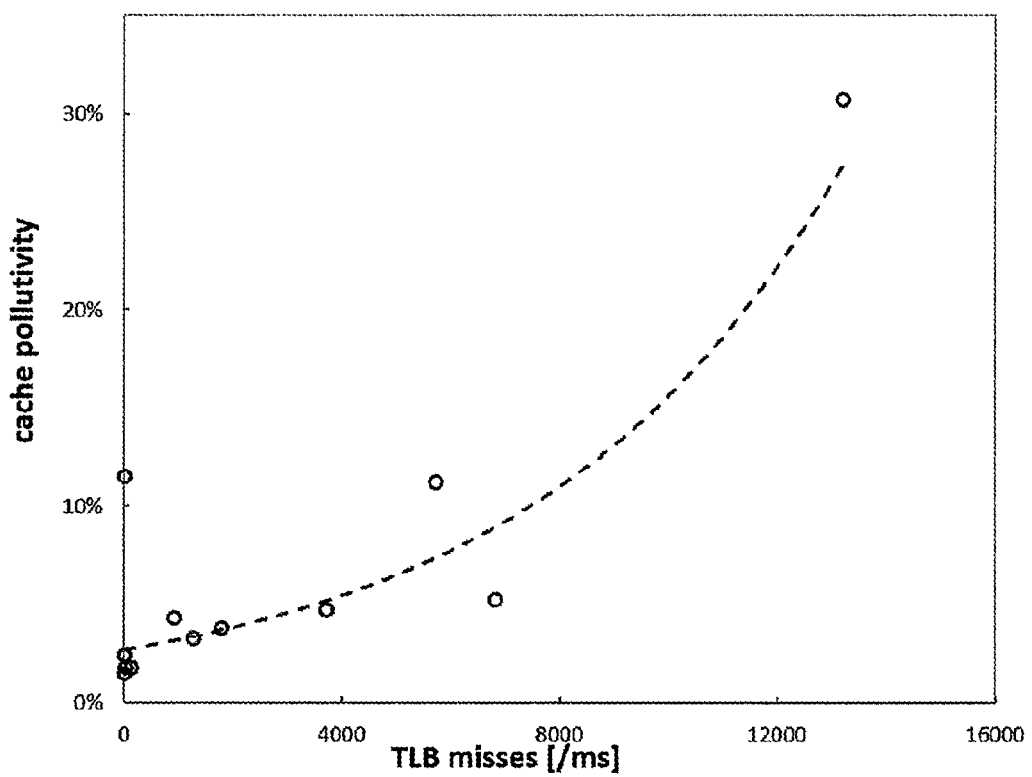
FIG. 14 is a graph indicating relationship between the number of dTLB misses of each application and cache pollutivity.

FIG. 14 is a graph indicating relationship between the number of dTLB (data translation lookaside buffer) misses of each application and the cache pollutivity.

The inventors have predicted that the number of cache misses [/s] can be used as an index of the cache pollutivity. However, actual cache pollutivity is more highly correlated with the number of dTLB misses [/s]. Thus, in the embodiment described below, the number of dTLB misses is utilized as the index of the cache pollutivity. Here, a data translation lookaside buffer is a buffer to be used by a memory management unit to achieve high speed of conversion from a virtual address to a physical address. The number of dTLB misses is the number of times a virtual address is not stored in a TLB when the CPU accesses memory space.

The number of dTLB misses of an application becomes an index of random access of an application by utilizing a plurality of pages at the same time. In a case where an application causes frequent random access to a plurality of pages, access to the same physical index occurs, which increases competitive cache misses. As a result of frequent occurrence of competitive cache misses, caches to be utilized by other application are overwritten, which lowers a cache hit ratio of other application. Thus, the number of dTLB misses of an application can be used as an index of the cache pollutivity.

Embodiment of the Present Invention

The present embodiment provides a method for tuning a virtual machine, a container, and the like, after the virtual machine, the container, and the like, are deployed.

A system of the present embodiment automatically optimizes performance with policy of allocating more cache memories to an application with higher cache sensitivity and allocating less cache memories to an application with higher cache pollutivity. This can reduce influence on other application.

In the present embodiment, a sum of the number of cache prefetches and the number of cache references is used as an evaluation index of the cache sensitivity. Further, the number of dTLB misses is used as an evaluation index of the cache pollutivity.

Figure 1:
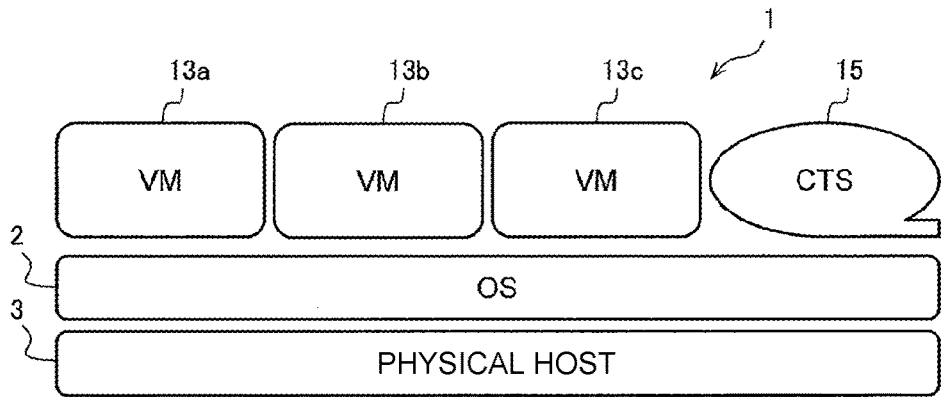
FIG. 1 is a view illustrating an example of a cache automatic optimization system in the present embodiment.

FIG. 1 is a view illustrating an example of a cache automatic optimization system 1 in the present embodiment.

The cache automatic optimization system 1 includes an OS (operating system) 2 which runs on the physical host 3, a plurality of virtual machines 13a to 13c which run on this OS 2, and a cache tuning system (CTS) 15.

The physical host 3 is combination of a central processing unit for causing these OS 2, a virtual machines 13a to 13c and cache tuning system 15 to operate, caches and a memory, and is constituted in a similar manner to the physical host 3 illustrated in, for example, FIG. 8 and FIG. 9.

The OS 2 is basic software for controlling execution of a program which runs on the physical host 3 and performs job management, input/output control, data management and processing relating to these.

Each of the virtual machines 13a to 13c is software or a framework which emulates operation of a computer. Each of virtual machines 13a to 13c can be regarded as an application when seen from the physical host 3. In other words, by using a capacity mask of the CLOS corresponding to the virtual machines 13a to 13c, desired amounts of cache memories can be allocated to the virtual machines 13a to 13c. Hereinafter, the virtual machines 13a to 13c will be simply described as a virtual machine 13 when the virtual machines 13a to 13c are not specifically distinguished from each other.

The cache tuning system 15 is a portion which tunes cache allocation amounts of an application which runs on the physical host 3. Functions of the cache tuning system 15 are embodied by a processor of the physical host 3, which is not illustrated, executing a cache tuning program. The virtual machine 13 is included in an application which runs on the physical host 3.

Figure 2:
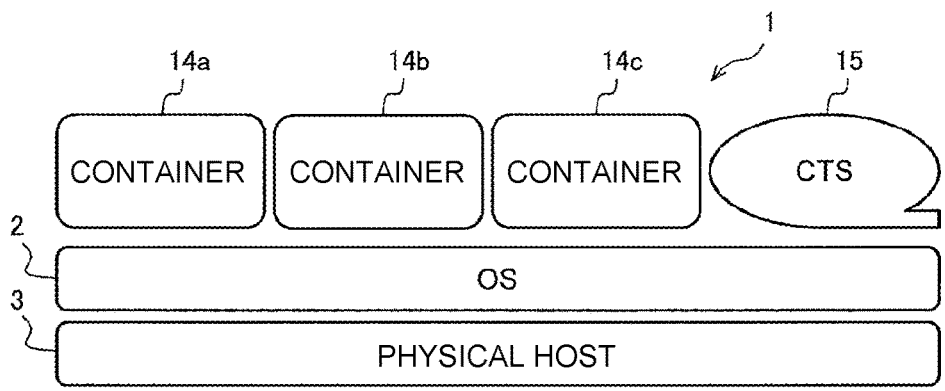
FIG. 2 is a view illustrating another example of the cache automatic optimization system.

FIG. 2 is a view illustrating another example of the cache automatic optimization system 1. The cache automatic optimization system 1 illustrated in FIG. 2 includes an OS 2 which runs on the physical host 3, a plurality of containers 14a to 14c which run on this OS 2, and the cache tuning system 15.

The physical host 3 is combination of a central processing unit for causing these OS 2, containers 14a to 14c and cache tuning system 15 to operate, caches and a memory.

The OS 2 is basic software for controlling execution of a program which runs on the physical host 3 and performs job management, input/output control, data management and processing relating to these.

The containers 14a to 14c are software or frameworks which provide virtual user space on the OS 2. Each of the containers 14a to 14c can be regarded as an application when seen from the physical host 3. In other words, by using a capacity mask of the CLOS corresponding to the containers 14a to 14c, desired amounts of cache memories can be allocated to the respective containers 14a to 14c. Hereinafter, the containers 14a to 14c will be simply described as a container 14 when the containers 14a to 14c are not specifically distinguished from each other.

The cache tuning system 15 is a portion which tunes cache allocation amounts of an application which runs on the physical host 3. Functions of the cache tuning system 15 are embodied by a processor of the physical host 3, which is not illustrated, executing a cache tuning program. The container 14 is included in an application which runs on the physical host 3, and thus, the cache tuning system 15 can tune cache allocation amounts of the container 14. The container 14 is included in an application which runs on the physical host 3.

Figure 3:
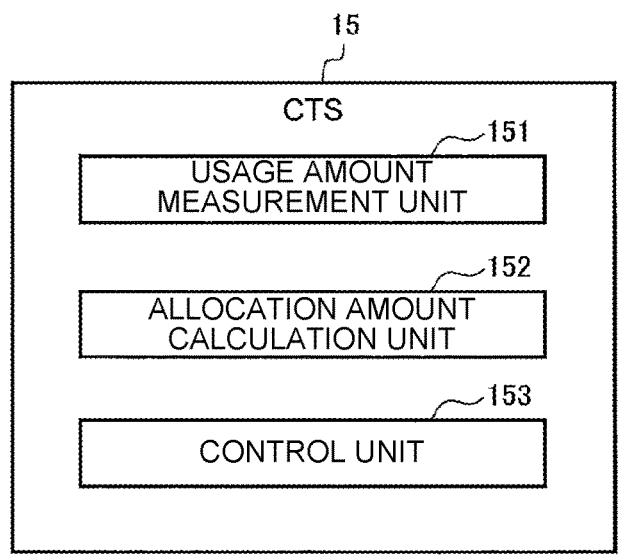
FIG. 3 is a block diagram of a cache tuning system.

FIG. 3 is a block diagram of the cache tuning system 15.

The cache tuning system 15 includes a usage amount measurement unit 151, an allocation amount calculation unit 152 and a control unit 153.

The usage amount measurement unit 151 measures the number of cache prefetches, the number of references and the number of dTLB misses concerning statuses of use of caches by each virtual machine 13, each container 14 and other application to acquire values.

The allocation amount calculation unit 152 calculates cache capacity to be allocated to each virtual machine 13, each container 14 and other application from the statuses of the caches measured by the usage amount measurement unit 151.

The control unit 153 allocates cache capacity to each virtual machine 13, each container 14 and other application on the basis of a result calculated by the allocation amount calculation unit 152. The control unit 153 functions as an allocation unit which allocates the calculated cache capacity to each virtual machine 13, each container 14 and other application.

FIG. 4 is a view illustrating operation of setting a capacity mask from each index relating to caches.

A top part of FIG. 4 indicates data indicating statuses of use of caches by VM_A, VM_B and VM_C which are virtual machines. A field of Reference indicates the number of cache references per 1 millisecond.

A field of Prefetch indicates the number of cache prefetches per 1 millisecond. A field of SUM(ref+pre) indicates a sum of the number of cache references and the number of cache prefetches per 1 millisecond. A field of dTLB miss indicates the number of dTLB misses per 1 millisecond. The field of Reference, the field of Prefetch and the field of dTLB miss store the values measured by the usage amount measurement unit 151. The field of SUM(ref+pre) stores the values calculated by the allocation amount calculation unit 152.

A middle part of FIG. 4 indicates data indicating procedure of calculating cache capacity to be allocated to VM_A, VM_B and VM_C which are virtual machines. A field of Sensitivity stores an index of cache sensitivity which is obtained by normalizing a value in the field of SUM(ref+pre) with 1.0. A field of Pollutivity stores an index of cache pollutivity which is obtained by normalizing a value in the field of dTLB miss with 1.0. A field of S+(1−P) stores a value obtained by subtracting a value in the field of Pollutivity from 1.0 and further adding a value in the field of Sensitivity. A field of Normalize stores a value obtained by normalizing a value in the field of S+(1−P) with 1.0 again. These respective fields store the values calculated by the allocation amount calculation unit 152.

A bottom part of FIG. 4 indicates a capacity mask of each CLOS relating to VM_A, VM_B and VM_C which are virtual machines. The control unit 153 sets a capacity mask of each CLOS relating to VM_A, VM_B and VM_C on the basis of the values in the field of Normalize calculated by the allocation amount calculation unit 152. By this means, predetermined amounts of caches are mapped to VM_A, VM_B and VM_C which are virtual machines.

Here, a capacity mask of each CLOS includes 16 bits. The number of bits to be set at each CLOS relating to each virtual machine is calculated with the following expression (1) to expression (3).

$$VM\_A : 16 * 1.00 = 16 \text{ bit} \quad (1)$$

$$VM\_B : 16 * 0.55 = 9 \text{ bit} \quad (2)$$

$$VM\_C : 16 * 0.25 = 4 \text{ bit} \quad (3)$$

Figure 5:
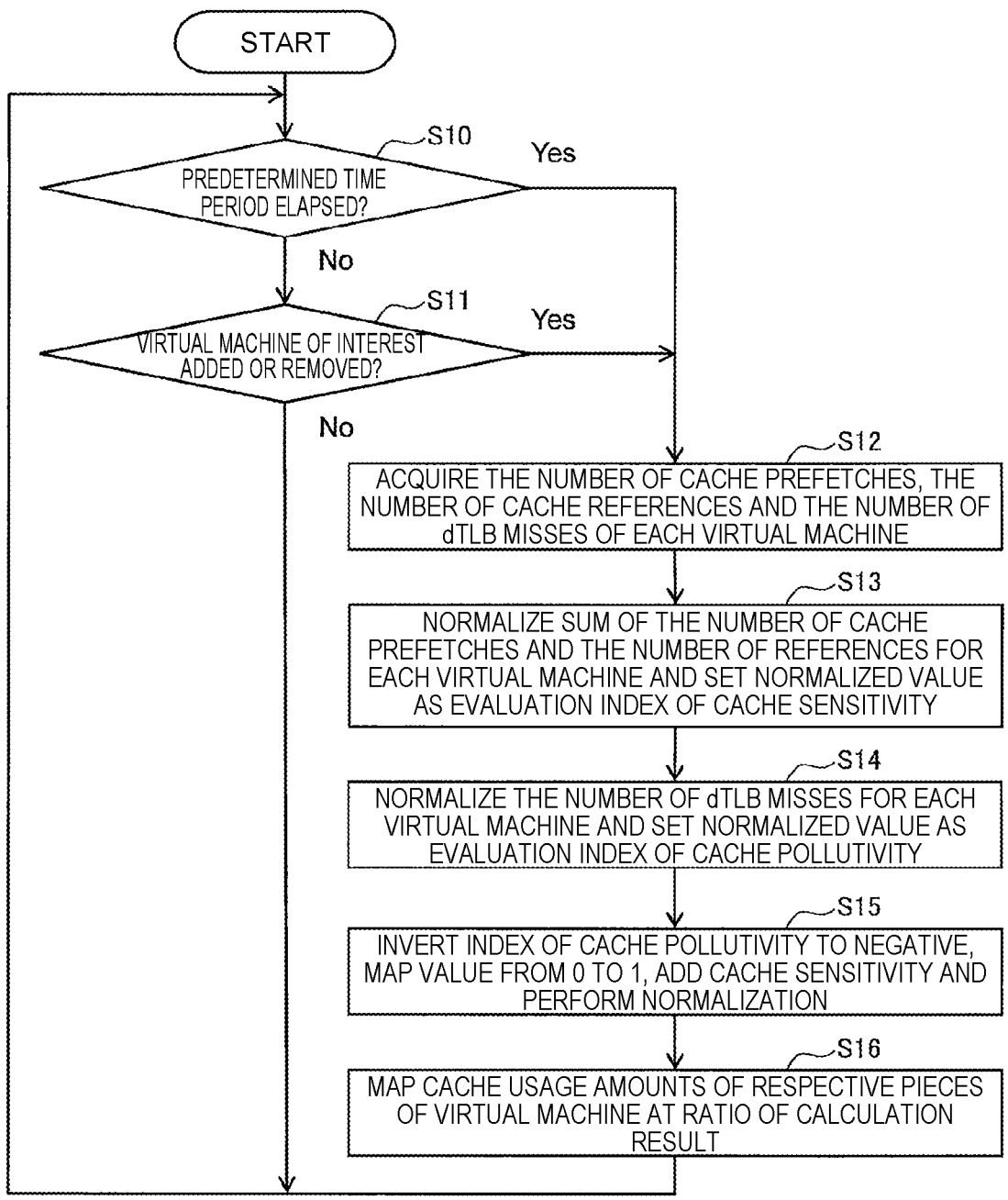
FIG. 5 is a flowchart of cache automatic optimization processing.

FIG. 5 is a flowchart of cache automatic optimization processing.

In step S10, the cache tuning system 15 determines whether or not a predetermined time period has elapsed. In a case where the predetermined time period has elapsed (Yes), processing of the cache tuning system 15 proceeds to processing in step S12. By this means, the cache tuning system 15 regularly acquires a cache parameter of each virtual machine 13, calculates allocation amounts of caches and dynamically allocates caches. Thus, even in a case where an application which runs on the virtual machine 13 or the container 14 changes, the cache tuning system 15 can reallocate cache capacity in accordance with the changed cache characteristics. In a case where the predetermined time period has not elapsed (No), the processing of the cache tuning system 15 proceeds to processing in step S11.

In step S11, the cache tuning system 15 determines whether or not any virtual machine 13 or container 14 of interest has been added or removed. In a case where any virtual machine 13 or container 14 has been added or removed (Yes), the processing of the cache tuning system 15 proceeds to the processing in step S12. This enables the cache tuning system 15 to perform tuning so as to automatically reallocate optimal caches to the virtual machine 13 or the container 14 which runs on the physical host 3.

In a case where any virtual machine 13 or container 14 has not been added or removed (No), the processing of the cache tuning system 15 returns to the processing in step S10.

The processing from step S12 to S16 which will be described below is processing of allocating caches to each virtual machine 13.

In step S12, the usage amount measurement unit 151 acquires the number of cache prefetches, the number of cache references and the number of dTLB misses of each virtual machine.

In step S13, the allocation amount calculation unit 152 normalizes a sum of the number of cache prefetches and the number of references for each virtual machine and sets the normalized value as an evaluation index of the Cache Sensitivity.

In step S14, the allocation amount calculation unit 152 normalizes the number of dTLB misses for each virtual machine and sets the normalized value as an evaluation index of the Cache Pollutivity.

In step S15, the allocation amount calculation unit 152 inverts the index of the Cache Pollutivity to a negative value, maps the value from 0.0 to 1.0, adds the Cache Sensitivity and performs normalization.

In step S16, the control unit 153 maps the cache usage amount of each virtual machine at a ratio of the calculation result of the allocation amount calculation unit 152. In this event, allocation is preferably updated so that a change amount of allocated bits becomes a minimum. When the processing in step S16 is ended, the processing of the control unit 153 returns to the processing in step S10.

Note that in the above-described step S12 to S16, the cache tuning system 15 allocates caches to each virtual machine. However, an allocation method is not limited to this, and the cache tuning system 15 may allocate caches to the containers or may further allocate caches to a common application which is neither a virtual machine nor a container.

FIG. 6 is a view illustrating another setting example of the capacity mask.

This capacity mask is normalized so that a sum of calculation results in the field of Normalize becomes 1.0, and at least one bit of the capacity mask is always allocated to one virtual machine. Such allocation is preferable in a case where the cache pollutivity of each virtual machine is high.

$$VM\_A:16*0.56=9 \text{ bit} \quad (4)$$

$$VM\_B:16*0.30=5 \text{ bit} \quad (5)$$

$$VM\_C:16*0.14=2 \text{ bit} \quad (6)$$

FIG. 7 is a view illustrating another setting example of the capacity mask.

The allocation amount calculation unit 152 performs normalization so that a maximum value of the calculation results in the field of Normalize becomes 1.0. The control unit 153 allocates all of 16 bits of the capacity mask to the CLOS of VM_A. In other words, all regions of the level 3 cache memory 34 are allocated to VM_A.

The control unit 153 further prevents the capacity mask of the CLOS of the VM_B from overlapping with the capacity mask of the CLOS of the VM_C. This prevents a region of the level 3 cache memory 34 allocated to the VM_B from overlapping with a region of the level 3 cache memory 34 allocated to the VM_C. It is therefore possible to prevent degradation of performance of the VM_C by operation of the VM_B.

<<Effects of the Present Embodiment>>

According to the present embodiment, after the virtual machine, the container, and the like, are deployed, the cache capacity can be tuned without being manually tuned. Further, according to the present embodiment, even in a case where an application which runs on the virtual machine or the container changes and the cache sensitivity or the cache pollutivity of the virtual machine changes, the cache capacity can be automatically tuned in accordance with the change.

<<Configuration of the Above-Described Embodiment and its Operational Effect>>

(1) A cache tuning device includes a memory to and from which data is written and read, a cache which can be accessed faster than the memory, a central processing unit configured to execute processing by performing write and read to and from the memory and the cache, a measurement unit configured to measure a usage condition of the cache by each application executed by the central processing unit, a calculation unit configured to calculate cache capacity to be allocated to the application from the usage condition, and an allocation unit configured to allocate the cache capacity to the application.

By this means, the cache usage amount of each application which runs on the physical host is automatically controlled, so that it is possible to optimize performance of each application.

(2) The measurement unit of the cache tuning device described in (1) measures the number of cache prefetches and the number of references in the application as the usage condition, and the calculation unit calculates such that cache capacity to be allocated to the application is larger as a sum of the number of cache prefetches and the number of references in the application is greater.

This enables the cache tuning device to allocate more cache capacity to an application which has higher cache sensitivity.

(3) The measurement unit of the cache tuning device described in (1) measures the number of dTLB (data translation lookaside buffer) misses in the application as the usage condition, and the calculation unit calculates such that cache capacity to be allocated to the application is smaller as the number of dTLB misses in the application is greater.

This enables the cache tuning device to allocate less cache capacity to an application which has higher cache pollutivity.

(4) The measurement unit of the cache tuning device described in (1) measures the number of cache prefetches, the number of references and the number of dTLB misses in the application as the usage condition, and the calculation unit calculates a normalized value of a value obtained by subtracting a normalized value of the number of dTLB misses from a normalized value of a sum of the number of cache prefetches and the number of references in the application as the cache capacity.

This enables the cache tuning device to allocate cache capacity to each application in accordance with cache sensitivity and cache pollutivity of the application.

(5) A cache tuning method to be executed by a computer including a memory to and from which data is written and read, a cache which can be accessed faster than the memory, and a central processing unit configured to execute processing by performing write and read to and from the memory and the cache, the cache tuning method including a step of measuring a usage condition of the cache by each application executed by the central processing unit, a step of calculating cache capacity to be allocated to the application from the usage condition, and a step of allocating the cache capacity to the application.

By this means, a cache usage amount of each application which runs on a physical host is automatically controlled, so that it is possible to optimize performance of each application.

(6) In the cache tuning method described in (5), the computer executes the step of measuring the usage condition of the cache, the step of calculating the cache capacity, and the step of allocating the cache capacity to the application for each predetermined time period.

By this means, in a case where cache sensitivity or cache pollutivity of each application which runs on a physical host changes, the cache capacity in accordance with the changed cache sensitivity or cache pollutivity is automatically allocated.

(7) In the cache tuning method described in (5), the computer executes the step of measuring the usage condition of the cache, the step of calculating the cache capacity, and the step of allocating the cache capacity to the application, every time a new application is started and every time an application which has run is ended.

By this means, optimal cache capacity is recalculated for each running application and automatically allocated every time each application which runs on the physical host is started or ended.

(8) A cache tuning program for causing a computer including a memory to and from which data is written and read, a cache which can be accessed faster than the memory, and a central processing unit configured to execute processing by performing write and read to and from the memory and the cache, to execute procedure of measuring a usage condition of the cache by each application executed by the central processing unit, procedure of calculating cache capacity to be allocated to the application from the usage condition, and procedure of allocating the cache capacity to the application.

By this means, the cache usage amount of each application which runs on the physical host is automatically controlled, so that it is possible to optimize performance of each application.

Modified Examples

The present invention is not limited to the above-described embodiment, and changes, for example, the following (a) to (f) can be made in a range not deviating from the gist of the present invention.

(a) The number of prefetches and the number of references described in the above-described embodiment are an example of the evaluation index of the cache sensitivity, and the evaluation index of the cache sensitivity is not limited to these values.

(b) The number of dTLB misses described in the above-described embodiment is an example of the evaluation index of the cache pollutivity, and the evaluation index of the cache pollutivity is not limited to this value.

(c) In the above-described embodiment, the index of the cache usage amount is obtained by inverting the index of the Cache Pollutivity to a negative value, mapping the value from 0 to 1, adding the Cache Sensitivity and performing normalization. A calculation formula at this time is S+(1−P). The calculation formula is not limited to this, and any calculation formula which increases the cache usage amount as the Cache Sensitivity is greater and decreases the cache usage amount as the Cache Pollutivity is greater may be employed.

(d) The allocation amount calculation unit only has to calculate more cache capacity to be allocated to an application as a sum of the number of cache prefetches and the number of references in each application is greater, and the calculation formula is not limited to S+(1−P).

(e) The allocation amount calculation unit only has to calculate less cache capacity to be allocated to an application as the number of dTLB misses in each application is greater, and the calculation formula is not limited to S+(1−P).

(f) Setting of the capacity mask is not limited to the examples illustrated in FIG. 4, FIG. 6 and FIG. 7.

REFERENCE SIGNS LIST

1 Cache automatic optimization system
13, 13a to 13d Virtual machine
14, 14a to 14c Container
15 Cache tuning system
151 Usage amount measurement unit (measurement unit)
152 Allocation amount calculation unit (calculation unit)
153 Control unit (allocation unit)
2 OS
3 Physical host
31, 31a to 31d CPU core (central processing unit)
32a to 32d Level 1 cache memory
33a to 33d Level 2 cache memory
34 Level 3 cache memory
35 Main memory

The invention claimed is:

1. A cache tuning device comprising:
a memory to and from which data is written and read;
a cache configured to be accessed faster than the memory;
a central processing unit configured to execute processing by performing write and read to and from the memory and the cache;
a measurement unit, including one or more processors, configured to measure a usage condition of the cache by each application executed by the central processing unit;
a calculation unit, including one or more processors, configured to calculate cache capacity to be allocated to the application from the usage condition; and
an allocation unit, including one or more processors, configured to allocate the cache capacity to the application; wherein:
the measurement unit is configured to measure a number of cache prefetches and a number of references in the application as the usage condition, and
the calculation unit is configured to calculate such that cache capacity to be allocated to the application is larger as a sum of the number of cache prefetches and the number of references in the application is greater.

2. The cache tuning device according to claim 1, wherein the measurement unit is configured to measure a number of dTLB (data translation lookaside buffer) misses in the application as the usage condition, and the calculation unit is configured to calculate such that cache capacity to be allocated to the application is smaller as the number of dTLB misses in the application is greater.

3. The cache tuning device according to claim 1, wherein the measurement unit is configured to measure a number of cache prefetches, a number of references, and a number of dTLB misses in the application as the usage condition, and
the calculation unit is configured to calculate a normalized value of a value obtained by subtracting a normalized value of the number of dTLB misses from a normalized value of a sum of the number of cache prefetches and the number of references in the application as the cache capacity.

4. A cache tuning method to be executed by a computer comprising a memory to and from which data is written and read, a cache which can be accessed faster than the memory, and a central processing unit configured to execute processing by performing write and read to and from the memory and the cache, the cache tuning method comprising:
a step of measuring a usage condition of the cache by each application executed by the central processing unit;
a step of calculating cache capacity to be allocated to the application from the usage condition; and
a step of allocating the cache capacity to the application; wherein:
the computer is configured to execute the step of measuring the usage condition of the cache, the step of calculating the cache capacity, and the step of allocating the cache capacity to the application, every time a new application is started and every time an application which has run is ended.

5. The cache tuning method according to claim 4, wherein the computer is configured to execute the step of measuring the usage condition of the cache, the step of calculating the cache capacity, and the step of allocating the cache capacity to the application for a predetermined time period.

6. The cache tuning method according to claim 4, further comprising:
measuring a number of cache prefetches and a number of references in the application as the usage condition, and
calculating such that cache capacity to be allocated to the application is larger as a sum of the number of cache prefetches and the number of references in the application is greater.

7. The cache tuning method according to claim 4, further comprising:
measuring a number of dTLB (data translation lookaside buffer) misses in the application as the usage condition, and calculating such that cache capacity to be allocated to the application is smaller as the number of dTLB misses in the application is greater.

8. The cache tuning method according to claim 4, further comprising:
measuring a number of cache prefetches, a number of references, and a number of dTLB misses in the application as the usage condition, and
calculating a normalized value of a value obtained by subtracting a normalized value of the number of dTLB misses from a normalized value of a sum of the number of cache prefetches and the number of references in the application as the cache capacity.

9. A non-transitory computer readable medium storing a cache tuning program for causing a computer comprising a memory to and from which data is written and read, a cache which can be accessed faster than the memory, and a central processing unit configured to execute processing by performing write and read to and from the memory and the cache, to execute:
a step of measuring a usage condition of the cache by each application executed by the central processing unit;
a step of calculating cache capacity to be allocated to the application from the usage condition;
a step of allocating the cache capacity to the application; and
a step of measuring a number of dTLB (data translation lookaside buffer) misses in the application as the usage condition, and calculating such that cache capacity to be allocated to the application is smaller as the number of dTLB misses in the application is greater.

10. The non-transitory computer readable medium according to claim 8, wherein the cache tuning program further causes the computer to execute:
measuring a number of cache prefetches and a number of references in the application as the usage condition, and
calculating such that cache capacity to be allocated to the application is larger as a sum of the number of cache prefetches and the number of references in the application is greater.

11. The non-transitory computer readable medium according to claim 8, wherein the cache tuning program further causes the computer to execute:
measuring a number of cache prefetches, a number of references, and a number of dTLB misses in the application as the usage condition, and
calculating a normalized value of a value obtained by subtracting a normalized value of the number of dTLB misses from a normalized value of a sum of the number of cache prefetches and the number of references in the application as the cache capacity.

* * * * *